March 22, 1938.    A. PETERSEN    2,111,639
BRAIDED FABRIC AND METHOD OF MAKING SAME
Filed Sept. 28, 1936
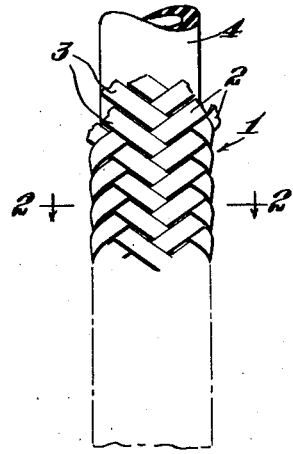
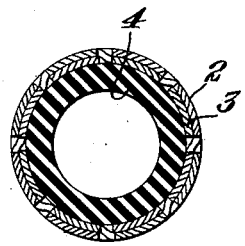
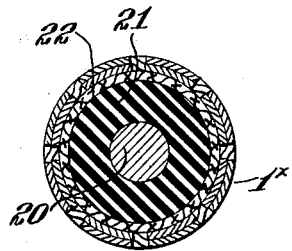
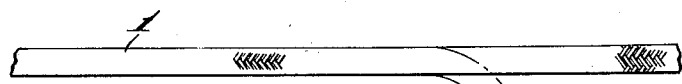
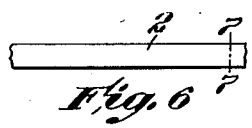
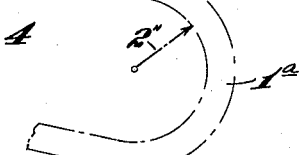
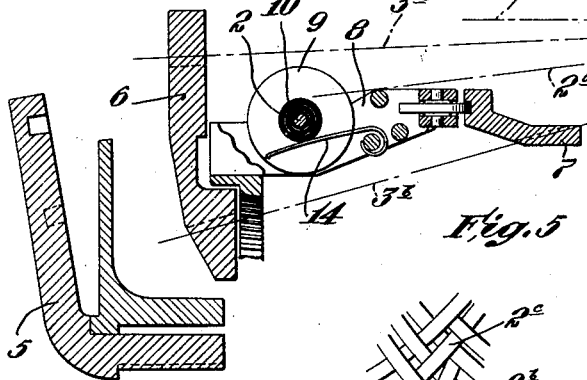
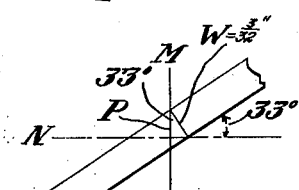
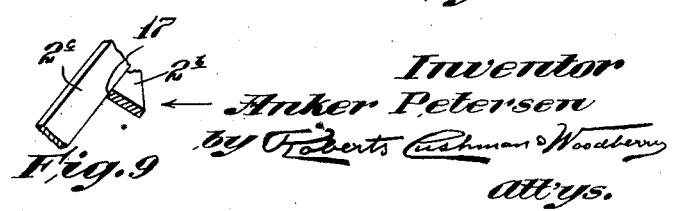
Inventor
Anker Petersen
by Roberts Cushman & Woodberry
attys.

Patented Mar. 22, 1938

2,111,639

UNITED STATES PATENT OFFICE 2,111,639

BRAIDED FABRIC AND METHOD OF MAKING SAME

Anker Petersen, Boston, Mass., assignor to James Joseph Lannon, West Newton, Mass.

Application September 28, 1936, Serial No. 102,871

2 Claims. (Cl. 96—3)

This invention pertains to braided fabrics and to a method of making the same, and relates more especially to a tubular braid (with or without a lining or core element) whose constituent strands are at least predominantly metallic ribbons and which is capable, when used for example as a jacket for a rubber tube or the like, of withstanding bursting pressures of the order of 20,000 pounds per square inch. Such a composite structure or hose, in small diameters, is suitable for conveying lubricant under high pressure, while in pressure-greasing systems, while in the larger diameters it is of value for such purposes as tree spraying, air brake lines, etc., in all of which flexibility coupled with high bursting strength and ability to withstand rough usage and elongating and crushing forces is essential.

At such high internal pressures as those just mentioned, the inner lining, for example the rubber core tube, must be supported externally at substantially all points, and if the stress-resisting jacket has interstices of any appreciable size, the readily yieldable rubber lining will be forced into and out through such interstices, causing rapid deterioration, if not actual rupture. Accordingly it is essential that such a jacket present as nearly an unbroken inner surface as possible in order to constitute the desired support for the core tube or lining, but on the other hand, this jacket must be sufficiently flexible to permit the hose to be bent around corners, etc.

An ordinary drawn tube of such a ductile metal as lead or copper does not possess the requisite tensile strength to resist these high bursting pressures, nor on the other hand does it offer substantial resistance to crushing. For this reason it has heretofore been proposed to form a jacket by interweaving or interbraiding strands of high tensile strength, and in order to reduce weight and obtain as smooth a surface as possible, it has been proposed to employ flat strands, each strand, for example, being made up of a plurality of wires laid side by side. However, prior efforts to produce a braided jacket from flat strands have, so far as is known to me, always resulted in the formation of a jacket which does not offer sufficient resistance to crushing and elongation (if flexible enough for the purpose) and having interstices of substantial size, which for the reasons above noted makes such a jacket wholly unsuitable for use when exposed to extremely high internal pressures.

As the result of long and expensive experimentation I have now discovered that flat ribbon of resilient metal of high tensile strength may be interbraided to form a smooth, flexible, tubular steel jacket substantially devoid of interstices of appreciable size and capable of so supporting an impervious core tube of rubber or the like as to enable such core tube to withstand bursting pressures of the order of 20,000 pounds per square inch.

In order to obtain the desired resistance to crushing, as well as the tensile strength necessary to resist high bursting pressure, it is substantially necessary to use strand material which is stiff and hard and tough and which is ordinarily quite resilient, but great difficulty has heretofore been experienced in interbraiding strands of such stiffly resilient character so as to produce a close, smooth braided structure devoid of large interstices and offering powerful resistance to elongation and bursting stresses.

I am aware that it has heretofore been proposed to braid ribbon-like strands of relatively soft material, for example, leather or the like, and that in order to obtain a close texture and to insure the smooth entry of each strand into the forming braid it has been proposed to provide the braiding machine with mechanically actuated beaters or with fixed guide cones adjacent to the braiding point and/or to impose a high tension upon each individual strand. Whether or not such expedients are successful when applied to the braiding of soft ribbon-like strands, I find them wholly inadequate when applied to the braiding of stiffly resilient ribbons of steel or the like so far as the production of a smooth, tight and uniform braid is concerned, at least when in accordance with usual practice the strands approach the braiding point at a steep angle.

Obviously, in dealing with such a refractory strand material as a stiffly resilient steel ribbon, mere tension can not be relied upon for insuring closeness of lay, since any tension sufficient to nullify the inherent stiffness and resiliency of the strand material would be so great as to interfere with the drive of the carriers and would unduly increase the power necessary to operate the machine. Moreover, mechanically acting beaters or fixed guide surfaces alone are inadequate to hold the converging stiffly resilient strand accurately and firmly in position long enough, during the braid-forming operation, to insure its firm retention by subsequently laid strands.

I have now discovered that by the simple expedient of so relatively arranging the carriers and the braiding point, that the strands from one set at least of the carriers always describe a conical surface whose apex is at the braiding point and which has a base angle of the order of 8°, the strands, no matter how stiff and resilient, and of whatever width, are permanently laid so close and tight (always with the same face of each strand outermost) as to produce a braid having the desired characteristics,—all without recourse to any adjunctive devices such as beaters, guide cones or the like. While I am not wholly certain as to the theoretical reason for such superior results, I believe it to be due to the fact that when the ribbon-like strand approaches the braiding point with its wide surface up (assuming a vertical axis for the braiding machine) and at the low angle of approach of approximately 8°, the run of strand (which at any instant extends from the carrier to the braiding point) constitutes a lever of the second order,— the carrier being the point of application of the force, the integral junction of the free run with that part of the strand which has already been interbraided constituting the fulcrum, and the next strand in advance of the particular strand under consideration constituting the load. This lever-like run of the strand is so positioned that its narrow edge abuts the next strand closely adjacent to the braiding point, and as the width of the strand represents the depth of the lever, substantially the whole resistance to edgewise bending of the strand is available in applying compacting force to the next adjacent strand. Moreover, as the lever arm between the fulcrum and the load is very short, as compared with the arm between the carrier and the load, a great mechanical advantage is obtained for compacting the strands, it being noted that the compacting force is available right at the braiding point and that this force is not relieved or released, if at all, until the following strands have taken up the load. While this lever-like or wrapping action would perhaps be as great or even greater at an even lower angle, it is essential to avoid too abrupt a bending of the strand between its approaching run and its final helical disposition in the braid, and I have found that an angle of approach of approximately 8° seems to be most desirable. While it is possible that a slightly greater angle may be permissible I believe that it should not vary greatly from 8° in either direction. As contrasted with the above-described procedure, if a ribbon-like, stiffly resilient strand be caused to approach the braiding point at a steep angle, it is no longer effective as a lever, since at the steep angle of approach it tends to twist as it moves toward the braiding point, thus presenting its flat side toward the next adjacent strand. In this position it has little inherent stiffness and is almost wholly ineffective to drive the next strand ahead of it so as effectively to compact the texture of the forming braid, except possibly when abnormally high and impractical tension is applied. As distinguishing from this latter suggestion, the present method makes a high tension wholly unnecessary and in fact undesirable, it having been found that with strand material well suited for the purpose herein described a tension of approximately eight pounds upon each individual strand is amply sufficent. Although strands of yarn or other soft textile material have previously been caused to approach the braiding point at a low angle, I believe that I am the first to discover the unexpected advantage of using a low angle in braiding stiffly resilient ribbon-like strands of metal or the like, and the first to produce tubular braid having the characteristics resulting from such mode of procedure, namely a close texture devoid of interstices of substantial area; ability to resist tremendous bursting pressures; and the ability to withstand powerful crushing and elongating forces.

Whatever may be the theoretical reason for this result, I find, for specific example, that in braiding resilient steel ribbon of approximately $\frac{3}{32}$ inch in width and 0.010 inch in thickness, and having a breaking strength of 100 pounds or more, upon a braiding machine of the kind above referred to, using eight carriers and with an angle of approach of the order of 8° for the strands from the inner series, and a tension of approximately 8 pounds upon each individual strand, I obtain a braided tubular structure wherein the constituent helices have a pitch of approximately 33½°, and lie so close together that such interstices, as are visible, seldom exceed 0.001 square inch in area; and although the resultant tubular braid is highly resistant to crushing and readily bends to a radius of the order of 2 inches, yet it will withstand a bursting pressure completely adequate for the intended use. Furthermore, this tubular structure is light in weight, of substantially uniform internal and external diameter, may be made at high speed in unlimited lengths upon a power driven braiding machine, and may be made either with or without a core element and/or an external casing or covering.

In addition to its suggested use as a jacket for a tubular hose, it has manifest advantages as an armor or sheathing for electrical cable or the like, its flexibility permitting it to be bent to the desired degree for such use, while its closeness of texture makes it fireproof and useful in substitution for the commonly employed helically disposed steel armor or sheathing, which is far less flexible and substantially heavier than the braided sheathing of the present invention.

In the accompanying drawing, wherein one desirable embodiment of the invention has been illustrated by way of example.

Fig. 1 is a fragmentary elevation, to large scale, of a completed hose embodying the present invention;

Fig. 2 is a section on the line 2—2 of Fig. 1;

Fig. 3 is a similar section illustrating the present invention as applied to form a sheathing or armor for an electrical cable;

Fig. 4 is an elevation, to smaller scale, illustrating the flexibility of the improved braid;

Fig. 5 is a diagrammatic view illustrating certain elements of a braiding machine and indicating the angle of approach of the strands as they merge at the braiding point;

Fig. 6 is a fragmentary plan view to large scale of one of the ribbon-like metallic strands;

Fig. 7 is a section to larger scale on the line 7—7 of Fig. 6;

Fig. 8 is a fragmentary perspective view illustrative of one theory as to the action of the merging strands at the braiding point;

Fig. 9 is a diagrammatic view showing the supposed action of a strand of the inner set in crowding the next adjacent strand circumferentially of the braid;

Fig. 10 is a diagrammatic plan view illustrating this compacting action of the inner strands; and Fig. 11 is a diagram indicating the theoretical best relation of the number of picks per inch,— the angle of pitch, and the width of strand.

Referring to the drawing, the numeral 1 designates a high pressure hose constructed in accordance with the present invention and comprising an outer sheathing consisting of two sets 2 and 3, respectively, of ribbon-like strands of steel or other suitable material interbraided to form a tubular structure within which is disposed a tubular lining 4 of rubber or similar material which is flexible and substantially impervious to fluids and which is supported against bursting forces by the enclosing jacket or sheathing of interbraided strands. This improved high pressure hose made in accordance with the present invention, while capable of withstanding bursting pressures of the order of 20,000 lbs. to the square inch, when made in internal diameters of the order of ¼ inch, for example, is flexible enough to be bent to a short radius, for instance to a radius of 2 inches as indicated at $1^a$ in Fig. 4. Moreover, it is resistant to crushing forces so that, for example, when used as a grease conveying conduit for automobile lubrication it will not be crushed if accidentally run over by an automobile. Further, it is highly resistant to elongation when subjected to high internal pressure and may be dragged about without suffering damage or becoming permanently elongated.

In making the braided tubular sheathing in accordance with the present invention, I preferably employ flat ribbon-like strands, 2 and 3, the strands of each set, for example the strands 2, as indicated in Figs. 6 and 7, being of substantially greater width than thickness. For instance they may be approximately ten times as wide as thick, although this ratio may be varied in accordance with the material employed and the purpose for which the tubular braid is intended. Preferably the strands 2 and 3 are ribbons of steel, and in order to obtain the desired results the steel should be of high tensile strength and quite stiff and hard, and thus in most cases is quite resilient. This ribbon may be made as a drawn wire of the proper cross section and dimensions, preferably having a smooth surface and having the longitudinally extending grain structure characteristic of drawn metal. Steel of type commonly employed for clock springs is well suited for the purpose and is readily braided in accordance with the present method to form a close textured tubular braid. Theoretically, if the completed tubular braid is to be wholly devoid of interstices, that is to say, if adjacent strands of one set are substantially to contact with each other throughout the length of the braid, the number of picks per inch should equal the cosine of the angle of helical pitch divided by the width of the individual strand. As a matter of practice, this theoretical relation can not be fully obtained, but the present method of procedure approaches this theoretical perfection very closely, as may be understood from the fact that with a helical angle of 33° and a width of strand of $\frac{3}{32}$ of an inch, it has been possible to lay nine picks per inch, which indicates that the spacing between adjacent strands of a given set is extremely minute.

In accordance with the present method of preparing this tubular braid I prefer to employ a braiding machine of the general type disclosed in the patent to Petersen No. 1,796,738, dated March 13, 1931, that is to say a braiding machine of the type in which one set of carriers revolves in a circular path in one direction about the axis of the braiding machine, while the other set either revolves in the opposite direction or remains stationary, the strands from the first set describing a substantially conical surface as they approach the braiding point, while the strands of the second set are so actuated as to move first above and then below successive strands of the first set.

Referring to Fig. 5 certain elements of such a preferred form of braiding machine are diagrammatically indicated, the numeral 5 indicating the fixed cam ring, while the numerals 6 and 7 designate the outer and inner supporting rings for the carriers 8 of the inner set of strands. These carriers 8 are so supported by the rings 6 and 7 that the carriers may revolve about the vertical axis O—O of the machine in a substantially horizontal plane, while the carriers of the second set (not shown) are supported by the ring 6 and are caused to revolve in the opposite direction.

As illustrated, each carrier 8 supports a spool 9 with its axis 10 substantially horizontal, and upon each spool is wound one of the strands 2, for example. A suitable support 11 at the center of the machine carries the braiding die $11^a$ which is hollow and is coaxial with the path of the carriers, the lower end of this die $11^a$ defining the braiding point 12. If desired the passage through the die $11^a$ may be of a suitable size to provide for the introduction of a core member 13 which is drawn upwardly through the die $11^a$ by any suitable means, not shown, and about which the braided tubular structure is formed. For example, this core 13 may be the tubular rubber lining 4 designed to constitute a permanent element of the completed structure which is being made, or it may be merely a mandrel about which the braided material is formed and which is withdrawn from the braided tube either during or after the completion of the latter.

As illustrated in Fig. 5, the strands 2 from each of the spools 9, approach the braiding point 12 in the form of runs $2^a$ which are inclined at an angle of approximately 8° to a horizontal plane H through the braiding point. These runs $2^a$ of the strands from the spools 9 describe in space a conical surface having its apex at the braiding point 12, the base angle of the cone being approximately 8°, and it may be noted that the run $2^a$ is not deflected by contact with any mechanical part, either movable or fixed, on its way from the point at which it leaves the spool 9 until it arrives substantially at the braiding point. Furthermore since the axes of the spools 10 are substantially horizontal and the ribbon-like strands are wound with an ordinary spool wind upon the cores of the spools, the flat or wide surface of the strand is substantially uppermost as it approaches the braiding point, the narrow edge of the strand being in advance as the strand describes the conical path in space above referred to.

The strands 3 from the other set of carriers are moved by lever devices (not shown) such as are fully described in the above Petersen patent, so that they move alternately above and below the runs $2^a$ of the strands 2, the upper and lower limits of the paths of movement of the strands 3 being indicated in broken lines at $3^a$ and $3^b$, respectively.

Referring now to Figs. 8, 9 and 10, and assuming that the strand $2^b$ is from one of the carriers 9 and is just about to intermesh with strands of both series at the braiding point, it may be noted particularly with reference to Figs. 8 and 9, that the narrow edge of this strand $2^b$ is contacting with the narrow edge of the preceding strand $2^c$ of the same set and tends to push the latter strand before it. Referring to Fig. 10 it may be noted that the run 2$^b$ of the strand 2 extends from the point 15 where it leaves the spool to the point 16 where it is substantially tangential to the periphery of the formed braid, and that it contacts with the preceding strand 2$^c$ of the same set at the point 17, the latter point being much nearer to the point 16 than to the point 15. This run 2$^b$ of strand material may thus be considered as a lever having its fulcrum at the point 16, its load at the point 17 and the point of application of the force at the point 15 (it being noted that spool 2 is being positively driven in the direction of the arrow P). Since the strand in this position is moving edgewise in which it offers its maximum resistance to bending, and since (acting as a lever) its arm 15—17 is much longer than its arm 17—16, it is evident that it is capable of exerting a very powerful force against the strand 2$^c$, tending to move the latter peripherally of the braid. Moreover the point of application of this compacting force is right at the braiding point where it is most effective to force the strands firmly together, and since the run 2$^b$ of the strand is constantly moving in a wrapping direction about the axis of the braid it is clear that there is no release of this compacting force, so that once compacted the constituent strands are not able to spring back away from each other as would be the case if mechanical beating up fingers or the like were to be employed.

While in theory the maximum lever action for compacting the strands would be obtained if the runs 2$^a$ of the strands were horizontal, such an arrangement is not desirable since it would mean a very abrupt bend or change in angle of the strand as the latter takes up its position in helical form in the completed braid and it has been found experimentally that an angle of substantially 8° appears best for the purpose. While as here illustrated the strands of the inner set only are kept at this exact angle during the braiding operation, and the strands of the other set moving alternately above and below the strand 2, nevertheless the strands 3 do not depart greatly from the angle of 8° and it appears that if the strands of one set, for example the strands 2, are thoroughly compacted so as to form as close a structure as possible, the strands of the other set readily find their way into the places left for them by the strands 2, and eventually come into substantially as close contact with each other as do the strands 2.

While the above described theory of operation is that which appears the most probable because of the observed improved results, it is to be understood that the invention is not to be regarded as dependent upon the correctness of this theory, it sufficing to follow the mode of procedure above described to attain the desired results.

When the braided sheathing is made as above described it is found that the spaces between adjacent strands are very narrow and that the interstices between the strands at the crossing points are so small, for example of the order of 0.001 inch in area, that the sheathing satisfactorily supports a lining tube 4 of rubber, even though the latter be subjected to the enormous internal pressure of 20,000 lbs. per square inch, which would, if the interstices were of any substantial size, cause the rubber lining to be protruded into and through the interstices or apertures and to blow out, thus destroying the utility of the hose.

Although the strands approach the braiding point without engaging any mechanical part such as beating fingers, guide cores or the like, yet in accordance with the present method and by arranging the strands 2 to approach the braiding point at the angle specified, it is found that all of the strands find their way smoothly into the forming braid and always present the same surface outwardly throughout the entire length of the braided structure. It is also to be noted that the braided structure made in accordance with the present invention may be made unitarily in great and unlimited lengths, that it is of substantially uniform diameter internally and externally throughout its length and that it has a relatively smooth outer surface readily capable of being drawn into tubular covering jackets or through conduits or the like. It is further to be noted that in making this braided fabric it is desirable to employ an even number of carriers, at least four in number, and preferably eight or more, thereby to produce a balanced braid without tendency to twist or writhe and in which the crossing points always extend in substantially straight lines longitudinally of the braid, thereby contributing to smoothness of surface texture.

While the improved braided sheathing above described is of particular value for high pressure hose, it is also useful as a protective sheathing for electrical conductors or the like. Thus as illustrated in Fig. 3$^a$, an electrical conductor 20 of copper or the like, provided with an outside insulating covering 21 of rubber, for example, and with a jacket 22 of textile material, is housed in a sheathing 1$^x$ of interbraided metallic ribbons similar to the sheathing 1 above described and made in substantially the same way, the conductor with its insulation and jacket being drawn through the braiding die and forming the core about which the metallic strands are interbraided.

Obviously the improved flexible tubular sheathing, as above described, may be found useful for other purposes than those herein specifically described, and it is to be understood that the invention is not to be limited to the particular utilities herein disclosed. It is further to be understood that the invention is not necessarily limited to the use of ribbons of any specific width or thickness and that other materials than steel, conferring the desired qualities of high tensile strength, resistance to crushing, elongation, etc. may be employed in making the improved tubular braid in so far as such other materials may be found useful for the purpose.

I claim:

1. That method of making a flexible tubular braid useful as a jacket for hose or as sheathing for an electrical conductor and capable of flexing sharply but possessing high resistance to crushing or elongation, which comprises as steps providing strand masses each consisting of flat ribbonlike stiffly resilient metallic strand material of high tensile strength and of substantially greater width than thickness, disposing the masses to form two distinct sets, causing the strand masses of one set to revolve about a predetermined axis in one direction, the strand material leading from each such mass extending in a free, uninterrupted, substantially straight run from the strand mass to the braiding point, each such straight run describing a right conical surface in space as the mass revolves and with the apex of the cone at the braiding point, and with an angle of the order of 8° at the base of the cone, each such run as it describes said conical surface having one of its narrower edges in advance, the strand masses of the other set revolving in the opposite direction and the corresponding runs of strand material moving alternately above and below the straight run of the first set, the straight run of the first set at least acting as levers to compact the braided structure at the braiding point.

2. A machine-made tubular braid that is unitarily made of great and unlimited length, composed of a plurality of parallel-sided metallic strands, at least eight in number, each strand being inherently resilient and of a width of the order of ten times its thickness, and having a breaking strength of 100 pounds or more, each strand throughout the entire braid having the same face always outermost, the number of picks per inch of length of the braid substantially equalling the cosine of the angle of helical pitch divided by the width of the ribbon whereby the intertwined helices are so closely disposed that such interstices as exist at the crossings of the helices do not substantially exceed 0.001 square inch in area, the tubular braid being capable of flexing to a radius of the order of 2 inches, and having a bursting strength of the order of 20,000 pounds per square inch.

ANKER PETERSEN.